W. N. BROWN.
Vapor Burner.
No. 28,250.  Patented May 15, 1860.
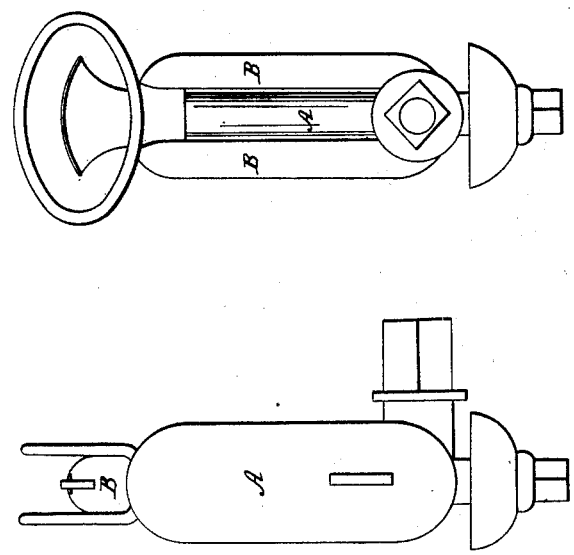
Witnesses:
Geo. L. M. Gills
J. Knight
Inventor:
Wm. N. Brown

UNITED STATES PATENT OFFICE.

WM. N. BROWN, OF CAMDEN, NEW JERSEY.

VAPOR-BURNER.

Specification of Letters Patent No. 28,250, dated May 8, 1860.

*To all whom it may concern:*

Be it known that I, WILLIAM N. BROWN, of Camden, in the county of Camden and State of New Jersey, have made an Improvement in Vapor-Burners; and I do hereby declare that the following is an exact and full description thereof.

The nature of my improvement consists in the combination of a heat-conductor with a non-conductor in hydro-carbon vapor burners, for the purpose of securing to the heat conductor the greatest possible heat-conducting power.

The metallic portion of the burner (marked A in the accompanying drawings) is increased in a non-conducting material (marked B in the accompanying drawings,) so as to give the greatest possible heat conducting power to the metallic portion of the burner: to secure the confinement of the heat in the metallic part of the burner, and to protect the metallic surfaces of the burner from the cooling influence of the air.

The drawings hereunto attached exhibit the mode of combining said conductor and non conductor, which may be adopted in conformity to the foregoing plan and principles.

What I claim, therefore, as my improvement and desire to secure by Letters Patent is—

The combination of a heat conductor with a non-conductor in the hydro-carbon vapor burners for the purpose of securing to the heat-conductor the greatest possible heat conducting power, by employing a metallic heat conductor, incased in a non-conducting or partially non-conducting material as described and for the purpose set forth in the above given description of my invention, and in the drawings hereunto annexed or any other mode substantially the same, and which will produce the intended effect.

WM. N. BROWN.

Witnesses:
JOHN THOMPSON,
JAMES ROBINSON.